United States Patent [19]

Carlson et al.

[11] Patent Number: 4,790,030
[45] Date of Patent: Dec. 6, 1988

[54] TUNER WITH INSERTABLE ANTENNA COUPLER

[75] Inventors: David J. Carlson; William L. Lehmann, both of Indianapolis, Ind.

[73] Assignee: RCA Licensing Corporation, Princeton, N.J.

[21] Appl. No.: 934,887

[22] Filed: Nov. 25, 1986

[51] Int. Cl.⁴ .......................... H04B 1/18; H03J 1/06
[52] U.S. Cl. .................................. 455/193; 455/274; 334/85; 343/842
[58] Field of Search ............... 455/193, 280, 282, 217, 455/300, 274, 269, 298; 334/45, 15, 85; 333/24 R; 343/841, 842, 870, 702

[56] References Cited

U.S. PATENT DOCUMENTS

| 2,467,314 | 4/1949 | Johnson | 343/870 |
|---|---|---|---|
| 3,228,030 | 1/1966 | Moore | 343/842 |
| 3,576,495 | 4/1971 | Yoshizato | 455/193 |
| 3,702,958 | 11/1972 | Reynolds . | |
| 3,755,764 | 8/1973 | Suzuki . | |
| 3,938,046 | 1/1976 | Valdettaro . | |
| 4,001,696 | 1/1977 | Bannerman | 455/193 |
| 4,342,999 | 8/1982 | Woodward et al. | 455/274 |
| 4,361,819 | 11/1982 | Sillard et al. | 455/217 |
| 4,491,843 | 1/1985 | Boubouleix | 343/702 |
| 4,518,965 | 5/1985 | Hidaka | 455/193 |
| 4,605,899 | 8/1986 | Eumurian et al. | 343/842 |
| 4,635,297 | 1/1987 | Polischuk | 455/217 |

Primary Examiner—Robert L. Griffin
Assistant Examiner—Curtis Kuntz
Attorney, Agent, or Firm—Paul J. Rasmussen; Richard G. Coalter; Peter M. Emanuel

[57] ABSTRACT

Antenna coupling components including a coil and a static discharge resistor are mounted on a separate printed circuit board within a tuner that is positioned by means of projecting tabs on each end so as to self-center the coil with the inductor. A first tab extends through an aperture in the tuner wall and carries foil patterns for connecting an antenna to the coil and one end of the resistor. The other tab is secured to a slot in an internal shield to provide mechanical support for the board, electrical connection to ground for the other end of the resistor and which facilitates lateral movement of the coil during assembly. A connector block, fixed to the outside of the tuner enclosure, provides mechanical support and electrical insulation for the first tab and additionally provides electrical connection to a pair of antenna terminals and a right angle bend in the antenna circuit.

3 Claims, 2 Drawing Sheets

TUNER WITH INSERTABLE ANTENNA COUPLER

FIELD OF THE INVENTION

This invention relates to tuners and particularly to antenna couplers for tuners providing direct current (D.C.) isolation and alignment of an antenna coil with a resonant circuit in the tuner.

BACKGROUND OF THE INVENTION

Tuners provide the function of frequency selection in radio and television receivers. Typically, tuners include at least one tuned circuit having inductance and capacitance values selected to resonate at a desired frequency. In certain UHF television tuners, the inductance often comprises a transmission line while the capacitance may be provided by a varactor diode having a capacitance which varies with applied voltage for controlling the resonant frequency of the tuned circuit.

Radio frequency (R.F.) signals customarily are applied to a tuner by capacitive or inductive coupling. Both coupling methods facilitate D.C. isolation of an antenna from the tuner so as to avoid a potential shock hazard in receivers of a type in which the chassis may be coupled to one side of an A.C. power line. An example of the use of capacitive coupling of a balanced 300 Ohm antenna line to a VHF tuner is described by Valdettaro in U.S. Pat. No. 3,938,046 which issued Feb. 10, 1986. To prevent damage to the coupling capacitors by static charge build-up on the antenna line, one conductor is coupled to ground via a high valued (3.3 Meg-Ohm) static discharge resistor and is coupled to the other conductor via a moderate valued (a few thousand Ohms) line bridging resistor.

An example of magnetic coupling of a balanced antenna lines to a UHF tuner is described in Reynolds in U.S. Pat. No. 3,702,958 which issued Nov. 14, 1972. In the Reynolds tuner, an antenna coupling coil is supported by its leads so as to be in axial alignment with the tuner inductor. The coil leads are fastened directly to a pair of antenna terminals mounted on an insulating member fastened to the outside of the tuner housing. Static charge build-up is discharged by means of a bleeder resistor connected between one of the antenna terminals and the tuner housing.

A further example of a D.C. isolated magnetically coupled UHF tuner is described by Suzuki in U.S. Pat. No. 3,755,764 entitled ANTENNA COIL SUPPORT FOR A TUNER. The Suzuki tuner employs a transmission line inductor in its resonator circuit. For proper coupling to a transmission line inductor, it is important that the plane of the antenna coil be normal to the plane of the transmission line and that the coil major axis be aligned with the major axis of the transmission line. Suzuki achieves alignment by attaching the ends of a one-turn coil to an antenna terminal block that extends through an aperture in the side wall of the tuner, the aperture being aligned with the major axis of the transmission line. The free end of the one-turn coil is then secured in an upright position over the transmission line by means of a U-shaped clamp. The antenna connector block has terminals that are normal to the plane of the coil thus necessitating a one-half turn twist in the coil ends to ensure that the plane of the coil is normal to the transmission line over most of the length of the coil.

SUMMARY OF THE INVENTION

The present invention resides in part in recognizing the need for certain improvements in antenna coil mounting in turners of the type employing a transmission line resonator. In particular, needs exist for facilitating self-alignment of the coil with respect to the transmission line inductor, for enabling simultaneous assembly of the coil and bleeder resistor in the tuner during manufacture, for eliminating the need for twisting the coil leads to attain proper vertical alignment and for facilitating changes in lateral coil positioning during manufacture. The present invention is directed to meeting these needs.

A tuner embodying the invention comprises a first printed circuit board having a transmission line inductor disposed on a surface thereof and having a perimeter surrounded by an outer wall member, the wall member having an aperture formed therein proximate to a first end of the inductor. An internal shield member is mounted normal to the surface, proximate to a second end of the inductor and parallel to the outer wall member and includes a notch formed in an upper edge thereof. A second printed circuit board is mounted normal to the surface of the first board with a first end extending through the aperture, a second end with a projecting tab supported by the notch. An antenna coil is secured to the second board with the aperture and the notch being positioned with respect to the inductor so as to align the antenna coil in a plane normal to and centered with respect to the transmission line inductor.

A tuner, in accordance with a further aspect of the invention, further includes a static discharge resistor mounted on the second printed circuit board and electrically connected at one end thereof to a conductive surface disposed on the tab end of the board.

BRIEF DESCRIPTION OF THE DRAWING

The foregoing and further features of the invention are illustrated in the accompanying drawing wherein like elements are denoted by like reference designators and in which.

DETAILED DESCRIPTION

Figure 1:
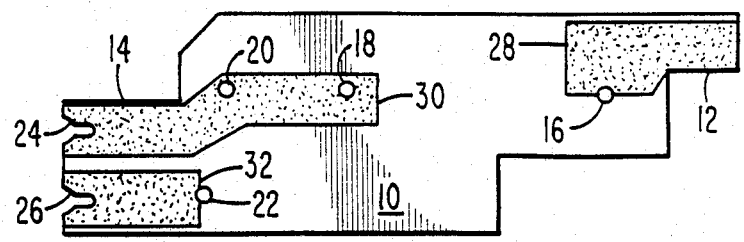
FIG. 1 is a plan view of the foil side of an antenna input printed circuit board embodying aspects of the invention.
Figure 2:
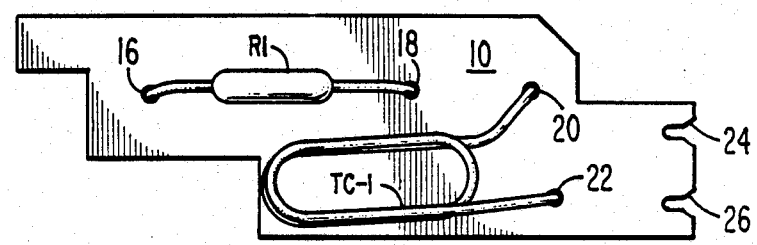
FIG. 2 is a plan view of the component side of the board of FIG. 1.

In tuners embodying the invention the antenna coupling coil TC-1 and static discharge (bleeder) resistor R1 are each mounted on a printed circuit board 10 to form a sub-assembly as illustrated in FIGS. 1 and 2. Board 10 is generally rectangular having portions thereof removed to form tab-like extensions 12 and 14 on the diametrically opposed corners of its major axis or "long" dimension. In an exemplary application, the outside dimensions are about 1.625 by 0.5 inches with the smaller tab measuring about 0.1 by 0.18 inches and the larger tab measuring about 0.3 by 0.25 inches. As will be explained, the tabs or projections provide a number of functions during initial assembly, final assembly and operation of tuners embodying the invention. These functions include facilitating self-alignment of coil TC-1 with a transmission line inductor, providing electrical connection of the coil and bleeder resistor to an antenna and ground point, enabling lateral adjustment of the coil position during manufacture, providing mechanical support for board 10 and facilitating subsequent disassembly of the tuner for repairs, if needed.

Component mounting and electrical connections are facilitated by means of four holes 16–22 drilled through board 10. As shown in FIG. 1, hole 16 is located near tab 12, holes 18 and 20 are located near the "upper" edge of projection 14 and hole 22 is near the lower edge of projection 14. The exact placement of the holes is not critical as long as three (18–22) are near tab 14 and one (16) is near tab 12. Two notches 24 and 26 are cut into the end of tab 14 which serve to receive antenna wires as will be explained.

Electrical connections are provided by three copper patterns 28–32 disposed on board 10 and indicated by shading. Pattern 28 extends from hole 16 to the end of tab 12. Pattern 30 extends across holes 18 and 20 to notch 24. Pattern 32 extends from hole 22 to notch 26. During sub-assembly of board 10 the leads of static discharge resistor R1 are inserted into holes 16 and 18 and soldered in place as shown in FIG. 2. The leads of two-turn antenna coupling coil TC-1 are inserted into holes 20 and 22 and soldered in place thereby completing the mechanical and electrical sub-assembly of printed circuit board 10.

Figure 3:
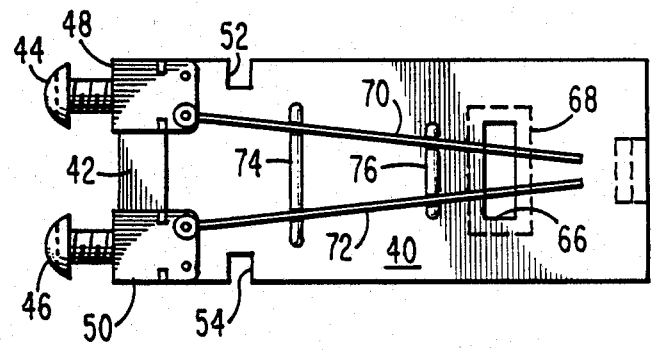
FIG. 3 is a plan view of an antenna connector block embodying aspects of the invention for use with the board of FIG. 1.
Figure 4:
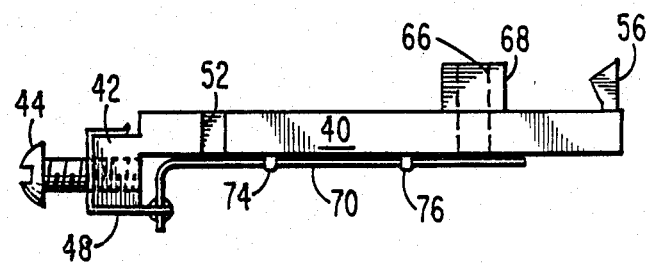
FIG. 4 is an edge view of the connector block of FIG. 3.

When board 10 is installed in a tuner (as will be explained) the notched end 14 will extend through an aperture in the tuner wall. The antenna terminal block 40 of FIGS. 3 and 4 provides several desirable functions facilitating use of board 10 including (1) providing electrical connections to conductors 30 and 32, (2) insulating conductors 30 and 32 from the side wall of the tuner enclosure and (3) providing mechanical support for the left side (projection 14) of board 10. Additionally block 40 provides a 90 degree bend in the electrical connections thereby enabling placement of antenna connector terminals on an adjacent sidewall of the tuner enclosure.

Figure 5:
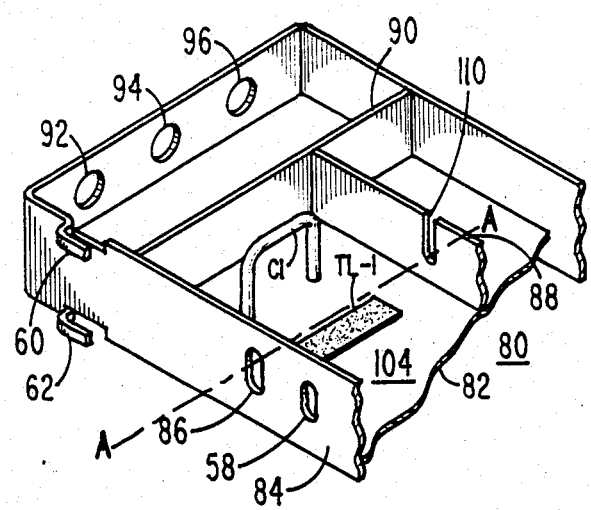
FIG. 5 is an oblique view of a tuner enclosure embodying aspects of the invention.
Figure 6:
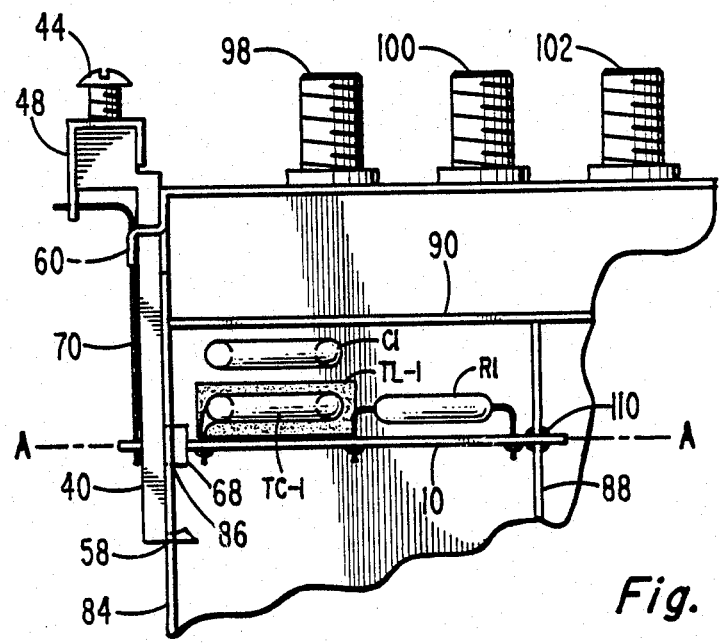
FIG. 6 is a plan view illustrating assembly of the antenna printed circuit board of FIGS. 1 and 2 and the connector block of FIGS. 3 and 4 in the tuner enclosure of FIG. 5 to form a tuner embodying the invention.

Antenna block 40 is formed of an insulating material (e.g., molded plastic) and is generally rectangular having nominal outside dimensions of ¾ by 1.5 inches with a thickness of about ⅛ inch. One end includes an L-shaped projection 42 that is drilled and taped for receiving a pair of antenna screws 44 and 46 with respective solder lugs 48 and 50 clipped to the L-projection 42. The upper and lower edges of block 40 are provided with notches 52 and 54 near the screw terminal end for receiving crimp tabs 60 and 62 formed from the tuner enclosure sidewalls as shown in FIGS. 5 and 6. The opposite end of block 40 is provided with a deformable hook 56 which extends normal to the inner surface of block 40 for engaging a mating slot 58 in the tuner sidewall. Accordingly, block 40 is secured to the tuner sidewall by inserting and crimping tabs 60 and 62 in slots 52 and 54 and engaging hook 56 in slot 58 as shown in FIG. 6.

Block 40 further includes a hole 66 formed near the hook end and surrounded by a projecting lip or collar 68. The hole has is dimensioned to be equal to or slightly larger than the dimensions of the notched end of board 10. The lip extension 68 surrounding hole 66 has a thickness at least equal to the thickness of the sidewall of the tuner enclosure so as to provide an annular insulating sleeve around the notched end of board 10 when the tuner is assembled as shown in FIG. 6. A pair of antenna wires 70 and 72 are soldered to lugs 48 and 50 and bent to overlay hole 66. Bosses 74 and 76 are provided intermediate hole 66 and lugs 48 and 50 for supporting the central portion of wires 70 and 72.

FIG. 5 provides details of a tuner enclosure 80 specially adapted for receiving circuit board 10 and antenna block 40. The enclosure includes a printed circuit board 82 having a transmission inductor TL-1 and a tuning capacitor loop C-1 disposed on the upper surface thereof and having a perimeter surrounded by a conductive (metal) outer wall member 84. Crimp tabs 60 and 62 and aperture 58 are formed in the outer wall 84 for securing block 40 thereto as previously explained and shown in FIG. 6. A further aperture 86, sized to fit the lip 68 of block 40 is provided near one end of transmission line TL-1. When assembled, lip 68 extends through wall 84 to provide mechanical support and electrical insulation for the projecting end 14 of printed circuit board 10.

Figure 7:
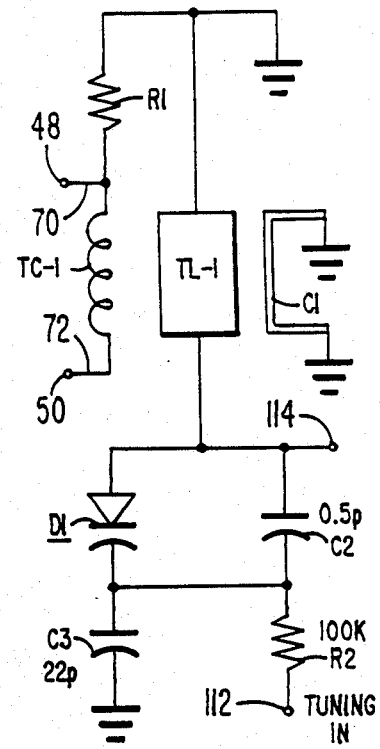
FIG. 7 is a schematic diagram of the antenna input circuit of the assembled tuner of FIG. 6.

The interior of enclosure 80 is divided into sections or compartments for various tuner circuits by means of internal shields 88 and 90 which are soldered to the outer wall 84 to provide grounded shielding between the compartments. The rear compartment is intended to house VHF RF switching circuits (not shown) and includes three holes 92–96 for mounting VHF F-type connectors 98–102 as shown in FIG. 6. The central compartment 104 houses the antenna input circuitry which includes, inter alia, board 10, transmission line inductor TL-1 and tuning loop capacitor C-1. The electrical schematic of the resonant circuit and coupler is shown in FIG. 7 and discussed subsequently.

Alignment of coil TC-1 with transmission line inductor TL-1 is facilitated by means of a notch 110 cut into the upper edge of internal shield 88 directly opposite to aperture 86. Specifically, notch 110 is aligned with aperture 86 so as to define a line AA parallel to the major axis of inductor TL-1 but offset therefrom by a distance selected such that coil TC-1 is centered over line TL-1 when board 10 is inserted into aperture 86 and slot 110 as shown in FIG. 6. A further function of slot 110 is to facilitate lateral movement of board 10 during assembly to center coil TC-1 lengthwise (laterally) with respect to line TL-1. After centering, tab 12 is soldered to slot 110 thereby providing both mechanical support for board 10 and completing the electrical connection of static discharge resistor R1 to ground. The remaining electrical connections and mechanical support are provided by inserting and soldering wires 70 and 72 into notches 24 and 26, respectively. This completes the electrical circuit shown in FIG. 7 which is tuned mechanically to a desired range by bending capacitor C1 to or from transmission line TL-1 and tuned electrically to a specific channel by applying a tuning voltage to terminal 112 which applies D.C. bias to varactor diode D1 by means of resistor R2. Padder capacitor C2 in parallel with diode D1 adjusts the tuning sensitivity. Capacitor C3 provides an RF bypass from the cathode of diode D1 to ground. The tuned signal appearing at output terminal 112 may be applied to an amplifier (not shown) for increasing the signal level for processing by other circuits of the tuner.

What is claimed is:

1. In a tuner, apparatus comprising:
    a first printed circuit board having a transmission line inductor disposed on a surface thereof and having a perimeter surrounded by an outer wall member having an aperture formed therein proximate to a first end of said inductor;
    an internal shield member mounted normal to said surface, proximate to a second end of said inductor and parallel to said outer wall members, said member having a notch formed in an upper edge thereof; and
    a second printed circuit board mounted normal to said surface, having a first end extending through said aperture, having a second end with a projecting tab supported by said notch, said second printed circuit board having an antenna coil secured thereto, said aperture and said notch being positioned with respect to said inductor so as to align said antenna coil in a plane normal to and centered with respect to said inductor;
    said second printed circuit board also having a static discharge resistor secured thereto, said static discharge resistor being electrically connected at a first end thereof to a first conductive surface disposed on said second printed circuit board and electrically connected to said antenna coil, said static discharge resistor being electrically connected at a second end thereof to a second conductive surface disposed on said tab of said second printed circuit board;
    said second conductive surface being soldered to said internal shield member at said notch both for electrically grounding said second end of said static discharge resistor and for securing said second end of said second circuit board so as to fixedly establish the lateral position of said antenna coil with respect to a major axis of said transmission line inductor.

2. In a tuner as recited in claim 1, apparatus further comprising an antenna terminal block secured to said outer wall and having an insulating lip extending through said aperture and surrounding said first end of said second printed circuit board.

3. In a tuner as recited in claim 1 wherein said second printed circuit board includes first and second notches formed in said first end of said second printed circuit board for receiving first and second antenna wires, said first notch being coupled by a conductive pattern to a first end of said antenna coil, said second notch being coupled via a second conductive pattern to a second end of said antenna coil and to a first end of a resistor having a second end electrically coupled via a third conductive pattern to said projecting tab.

* * * * *